(12) United States Patent
Rao et al.

(10) Patent No.: US 12,223,358 B2
(45) Date of Patent: Feb. 11, 2025

(54) CONNECTING ACCELERATOR RESOURCES USING A SWITCH

(71) Applicant: Intel Corporation, Santa Clara, CA (US)

(72) Inventors: Anil Rao, Menlo Park, CA (US); Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 710 days.

(21) Appl. No.: 17/350,874

(22) Filed: Jun. 17, 2021

(65) Prior Publication Data

US 2021/0311800 A1  Oct. 7, 2021

Related U.S. Application Data

(63) Continuation of application No. 15/682,896, filed on Aug. 22, 2017, now Pat. No. 11,249,808.

(51) Int. Cl.
*G06F 9/50*  (2006.01)
*G06F 9/4401*  (2018.01)
(Continued)

(52) U.S. Cl.
CPC .......... *G06F 9/5044* (2013.01); *G06F 9/4411* (2013.01); *G06F 9/4413* (2013.01); *G06F 9/4843* (2013.01); *H04L 67/10* (2013.01)

(58) Field of Classification Search
None
See application file for complete search history.

(56) References Cited

U.S. PATENT DOCUMENTS 4,769,777 A  9/1988 Bittle et al.
4,945,548 A  7/1990 Iannarone et al.
(Continued)

FOREIGN PATENT DOCUMENTS

WO  2012170829  12/2012
WO  2016039791  3/2016
WO  2019005391  1/2019

OTHER PUBLICATIONS

International Preliminary Report on Patentability for International Patent Application No. PCT/US2017/062452, dated Jun. 25, 2019.
(Continued)

*Primary Examiner* — Van H Nguyen
(74) *Attorney, Agent, or Firm* — Essential Patents Group, LLP; Christopher K. Gagne

(57) ABSTRACT

The present disclosure describes a number of embodiments related to devices and techniques for implementing an interconnect switch to provide a switchable low-latency bypass between node resources such as CPUs and accelerator resources for caching. A resource manager may be used to receive an indication of a node of a plurality of nodes and an indication of an accelerator resource of a plurality of accelerator resources to connect to the node. If the indicated accelerator resource is connected to another node of the plurality of nodes, then transmit, to a interconnect switch, one or more hot-remove commands. The resource manager may then transmit to the interconnect switch one or more hot-add commands to connect the node resource and the accelerator resource.

18 Claims, 6 Drawing Sheets

(51) Int. Cl.
*G06F 9/48* (2006.01)
*H04L 67/10* (2022.01)

(56) References Cited

U.S. PATENT DOCUMENTS

| | | | |
|---|---|---|---|
| 5,317,603 | A | 5/1994 | Osterwell |
| 6,917,999 | B2 | 7/2005 | Kumar et al. |
| 7,249,213 | B2 | 7/2007 | Feng et al. |
| 7,366,207 | B1 | 4/2008 | Vaishnav et al. |
| 7,474,612 | B1 | 1/2009 | Patel |
| 7,746,100 | B2 | 6/2010 | Lewis et al. |
| 7,849,208 | B2 | 12/2010 | Elzur et al. |
| 8,041,853 | B2 | 10/2011 | Castellano et al. |
| 8,384,417 | B2 | 2/2013 | Laisne et al. |
| 8,467,218 | B1 | 6/2013 | Atsatt et al. |
| 8,621,131 | B2 | 12/2013 | Loh et al. |
| 8,629,544 | B2 | 1/2014 | Jones et al. |
| 8,767,756 | B2 | 7/2014 | Black et al. |
| 8,782,321 | B2* | 7/2014 | Harriman ............ G06F 13/4295 710/316 |
| 8,880,923 | B2* | 11/2014 | Saunders ................ G06F 13/42 710/21 |
| 8,924,688 | B2 | 12/2014 | Sharma |
| 8,943,234 | B1 | 1/2015 | Voorhees et al. |
| 9,104,818 | B2 | 8/2015 | Miyoshi |
| 9,105,316 | B2 | 8/2015 | Jones et al. |
| 9,164,535 | B2 | 10/2015 | Chandra et al. |
| 9,424,228 | B2 | 8/2016 | Ramey et al. |
| 9,460,042 | B2 | 10/2016 | Iskandar et al. |
| 9,524,262 | B2* | 12/2016 | Wang ................ G06F 13/4022 |
| 9,559,905 | B2* | 1/2017 | Chen ................... H04L 41/0816 |
| 9,565,132 | B2 | 2/2017 | Chandra et al. |
| 9,626,321 | B2 | 4/2017 | Safranek et al. |
| 9,673,963 | B1 | 6/2017 | Ribo |
| 9,712,425 | B2 | 7/2017 | Holm et al. |
| 9,747,245 | B2 | 8/2017 | Guddeti et al. |
| 9,772,970 | B2 | 9/2017 | Luo et al. |
| 9,798,556 | B2 | 10/2017 | Ayyar et al. |
| 9,864,712 | B2 | 1/2018 | Brown et al. |
| 9,934,187 | B2 | 4/2018 | Shih |
| 9,965,439 | B2* | 5/2018 | Das Sharma ....... G06F 13/4291 |
| 10,002,038 | B2* | 6/2018 | Olson ................. G06F 11/0709 |
| 10,097,620 | B2 | 10/2018 | Reddy et al. |
| 10,162,786 | B2 | 12/2018 | Shin |
| 10,191,877 | B2 | 1/2019 | Harriman et al. |
| 10,394,747 | B1 | 8/2019 | Paneah et al. |
| 10,467,052 | B2 | 11/2019 | Chen et al. |
| 10,528,509 | B2* | 1/2020 | Benedict ............. G06F 13/4022 |
| 10,757,487 | B2 | 8/2020 | Kumar et al. |
| 11,095,556 | B2 | 8/2021 | Das Sharma et al. |
| 11,249,808 | B2* | 2/2022 | Rao ........................ G06F 9/4413 |
| 11,308,000 | B1* | 4/2022 | Richard ................... G06F 13/00 |
| 2002/0118668 | A1 | 8/2002 | Sawey et al. |
| 2003/0005200 | A1 | 1/2003 | Kumar et al. |
| 2004/0042483 | A1 | 3/2004 | Elzur et al. |
| 2004/0202148 | A1 | 10/2004 | Kuehnel |
| 2005/0018760 | A1 | 1/2005 | Smith et al. |
| 2005/0060469 | A1 | 3/2005 | Feng et al. |
| 2005/0086336 | A1 | 4/2005 | Haber |
| 2009/0074408 | A1 | 3/2009 | Black et al. |
| 2009/0267643 | A1 | 10/2009 | Lewis et al. |
| 2009/0303990 | A1 | 12/2009 | Ambrose et al. |
| 2010/0060310 | A1 | 3/2010 | Laisne et al. |
| 2010/0115174 | A1 | 5/2010 | Akyol et al. |
| 2010/0215054 | A1 | 8/2010 | Yakov |
| 2010/0315135 | A1 | 12/2010 | Lai et al. |
| 2011/0134705 | A1 | 6/2011 | Jones et al. |
| 2011/0179212 | A1 | 7/2011 | Hartman |
| 2013/0007414 | A1 | 1/2013 | Sharma |
| 2013/0007489 | A1 | 1/2013 | Unnikrishnan et al. |
| 2013/0054849 | A1 | 2/2013 | Loh et al. |
| 2013/0163605 | A1 | 6/2013 | Chandra et al. |
| 2013/0205053 | A1* | 8/2013 | Harriman ............ G06F 13/4295 710/105 |
| 2013/0246679 | A1 | 9/2013 | Miyoshi |
| 2014/0098617 | A1 | 4/2014 | Jones et al. |
| 2014/0122560 | A1 | 5/2014 | Ramey et al. |
| 2014/0223064 | A1* | 8/2014 | Wang .................. G06F 13/4027 710/301 |
| 2014/0321473 | A1 | 10/2014 | Chen et al. |
| 2014/0372663 | A1 | 12/2014 | Chandra et al. |
| 2015/0032917 | A1 | 1/2015 | Nguyen |
| 2015/0039787 | A1 | 2/2015 | Voorhees et al. |
| 2015/0067206 | A1 | 3/2015 | Luo et al. |
| 2015/0117504 | A1 | 4/2015 | Harriman et al. |
| 2015/0121115 | A1 | 4/2015 | Chandra et al. |
| 2015/0172090 | A1 | 6/2015 | Sawyer |
| 2015/0261718 | A1 | 9/2015 | Campbell et al. |
| 2015/0363350 | A1 | 12/2015 | Yeung et al. |
| 2015/0370736 | A1 | 12/2015 | Brown et al. |
| 2016/0028537 | A1 | 1/2016 | Erdogan et al. |
| 2016/0147606 | A1 | 5/2016 | Arroyo et al. |
| 2016/0147681 | A1 | 5/2016 | Arroyo et al. |
| 2016/0147697 | A1 | 5/2016 | Arroyo et al. |
| 2016/0147705 | A1 | 5/2016 | Arroyo et al. |
| 2016/0156544 | A1 | 6/2016 | Holm et al. |
| 2016/0179730 | A1 | 6/2016 | Halleck et al. |
| 2016/0179738 | A1 | 6/2016 | Guddeti et al. |
| 2016/0182186 | A1 | 6/2016 | Adler et al. |
| 2016/0191313 | A1 | 6/2016 | Chen et al. |
| 2016/0377679 | A1 | 12/2016 | Froelich et al. |
| 2017/0017604 | A1 | 1/2017 | Chen |
| 2017/0019247 | A1 | 1/2017 | Iyer et al. |
| 2017/0031863 | A1 | 2/2017 | Glaser |
| 2017/0039162 | A1 | 2/2017 | Mishra |
| 2017/0083475 | A1 | 3/2017 | Wu et al. |
| 2017/0116090 | A1 | 4/2017 | Arroyo et al. |
| 2017/0257273 | A1 | 9/2017 | Li et al. |
| 2017/0286359 | A1 | 10/2017 | McGowan |
| 2018/0227149 | A1 | 8/2018 | Johnson |
| 2018/0314550 | A1 | 11/2018 | Chen et al. |
| 2019/0007310 | A1 | 1/2019 | Das Sharma et al. |
| 2019/0026246 | A1 | 1/2019 | Chen et al. |
| 2019/0028262 | A1 | 1/2019 | Kobayashi et al. |
| 2021/0399982 | A1 | 12/2021 | Das Sharma et al. |

OTHER PUBLICATIONS

International Preliminary Report on Patentability for International Patent Application No. PCT/US2018/019896, dated Oct. 1, 2019.
International Preliminary Report on Patentability for International Patent Application No. PCT/US2018/035034, dated Dec. 31, 2019.
International Search Report and Written Opinion for International Patent Application No. PCT/US2017/062452, dated Mar. 13, 2018, 8 pages.
International Search Report and Written Opinion for International Patent Application No. PCT/US2018/019896, dated Jun. 12, 2018, 9 pages.
International Search Report and Written Opinion for International Patent Application No. PCT/US2018/035034, dated May 30, 2018, 11 pages.
Notice of Allowance for U.S. Appl. No. 15/387,802, dated Mar. 25, 2020.
Notice of Allowance for U.S. Appl. No. 15/476,571, dated Aug. 5, 2020.
Notice of Allowance for U.S. Appl. No. 15/639,393, dated Apr. 12, 2021.
Office Action for U.S. Appl. No. 15/387,802, dated Apr. 18, 2018.
Office Action for U.S. Appl. No. 15/387,802, dated Jan. 8, 2019.
Office Action for U.S. Appl. No. 15/387,802, dated Nov. 29, 2019.
Office Action for U.S. Appl. No. 15/476,571, dated Apr. 16, 2020.
Office Action for U.S. Appl. No. 15/639,393, dated Feb. 5, 2021.
Office Action for U.S. Appl. No. 15/682,896, dated Apr. 14, 2021.
Office Action for U.S. Appl. No. 15/682,896, dated Oct. 1, 2020.
Das Sharma, et al., "Adjustable Retimer Buffer", U.S. Appl. No. 15/476,571, filed Mar. 31, 2017, 73 pages.
Das Sharma, et al., "Techniques to Support Multiple Protocols Between Computer System Interconnects", U.S. Appl. No. 15/639,393, filed Jun. 30, 2017, 63 pages.

(56) References Cited

OTHER PUBLICATIONS

Hanawa, et al., "Interconnection Network for Tightly Coupled Accelerators Architecture", 2013 IEEE, pp. 79-82.
Jen, et al., "Low Latency Retimer", U.S. Appl. No. 15/387,802, filed Dec. 22, 2016, 70 pages.
Pezzarossa, et al., "Reconfiguration in FPGA-Based Multi-Core Platforms for Hard Real-Time Applications", 2016 IEEE, 8 pages.
Prabhakaran, et al., "A Dynamic Resource Management System for Network-Attached Accelerator Clusters", 2013 IEEE, pp. 773-782.
Rinke, et al., "A Dynamic Accelerator-Cluster Architecture", 2012 IEEE, pp. 357-366.
Tsuruta, et al., "Accelerator-in-Switch: a framework for tightly coupled switching hub and an accelerator with FPGA", 2017 IEEE, 4 pages.
Notice of Allowance for U.S. Appl. No. 15/682,896, dated Jul. 8, 2021.
Office Action for U.S. Appl. No. 15/639,393, dated Sep. 1, 2020.
Notice of Allowance for U.S. Appl. No. 15/682,896, dated Oct. 27, 2021.
Notice of Allowance for U.S. Appl. No. 17/114,089, dated Nov. 24, 2021.
Office Action for U.S. Appl. No. 17/391,557, dated Oct. 31, 2022.
Notice of Allowance from Chinese Patent Application No. 201810803098.2 notified May 29, 2024, 7 pgs.
Office Action from Chinese Patent Application No. 201810803098.2 notified Dec. 21, 2023, 22 pgs.
Office Action from Chinese Patent Application No. 202110862867.8 notified Mar. 15, 2024, 12 pgs.
Office Action from Chinese Patent Application No. 202110862867.8 notified Oct. 12, 2023, 18 pgs.
Office Action from Chinese Patent Application No. 202110862867.8 notified Jun. 28, 2024, 12 pgs.

* cited by examiner

Non-transitory computer-readable storage media 602, as may be implemented in embodiments of FIG. 3.

Programming instructions 604
to cause a digital content consumption device, in response to execution of the instructions by a processor of the digital content consumption device, to practice aspects of embodiments of the processes of FIG. 4.

FIG. 6

CONNECTING ACCELERATOR RESOURCES USING A SWITCH

CLAIM FOR PRIORITY

This application is a continuation of and claims priority to U.S. patent application Ser. No. 15/682,896, filed on Aug. 22, 2017, titled "CONNECTING ACCELERATOR RESOURCES USING A SWITCH", now U.S. Pat. No. 11,249,808, issued Feb. 15, 2022, which application is hereby incorporated herein by reference in its entirety.

FIELD

Embodiments of the present disclosure generally relate to the field of computing systems. More specifically, embodiments relate to devices and methods for switching one or more node resources, which may include central processing units (CPUs) with one or more accelerator resources.

BACKGROUND

Over the last several years, workload demands within data centers have greatly increased. In response, data centers have become larger; have included additional data center racks with various resources that may be interconnected with each other in various ways to meet both increasing and fluctuating workload demands.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6 is a diagram illustrating computer readable media having instructions for practicing managing connections between node resources and accelerator resources using an interconnect switch, in accordance with various embodiments.

DETAILED DESCRIPTION

Figure 1:
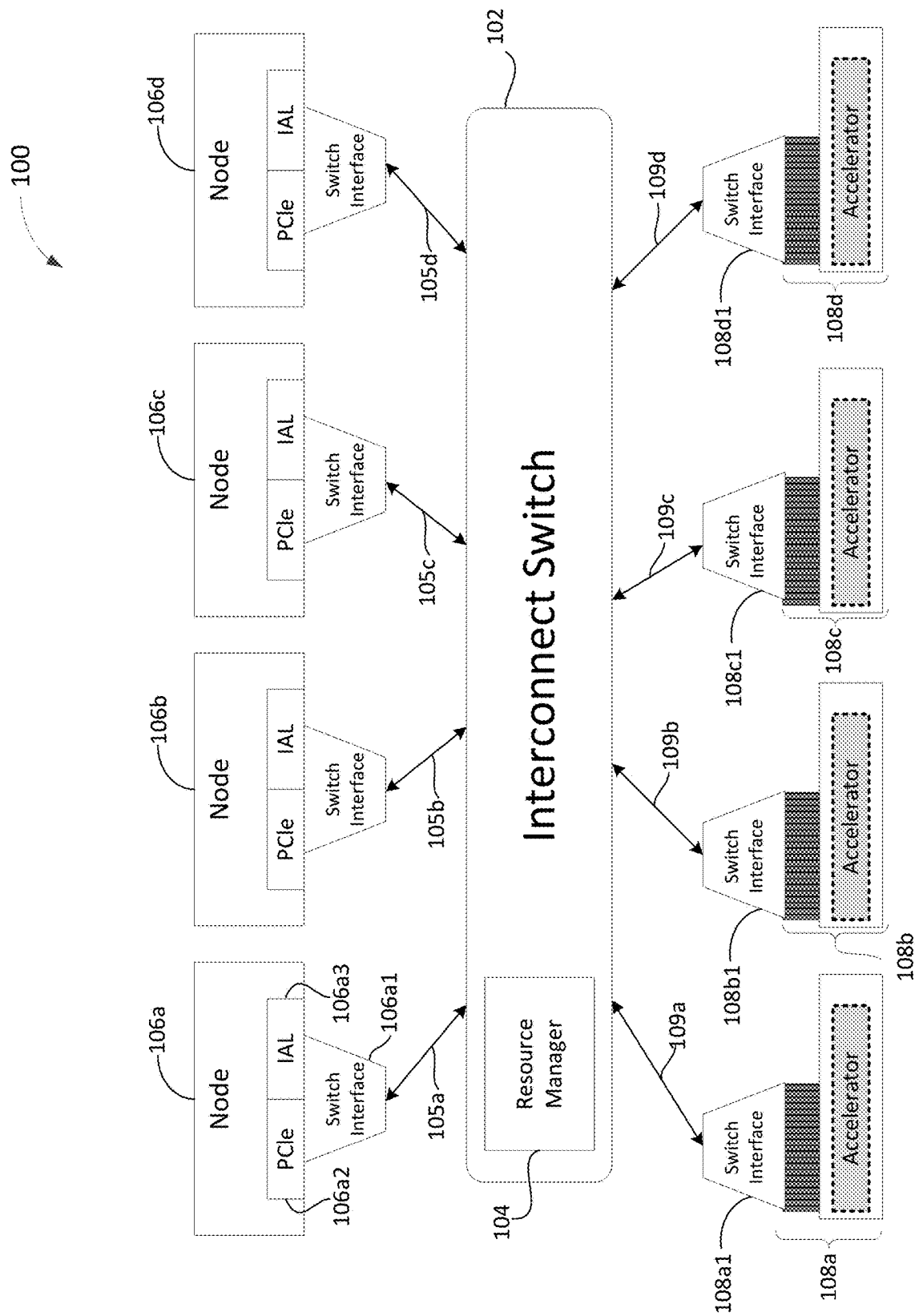
FIG. 1 is a diagram of an example implementation of an interconnect switch to connect node resources with accelerator resources, in accordance with various embodiments.

Methods, apparatuses, and systems that may allow accelerator resources to be shared with node resources that may be located within a rack or a pod by using a low-latency switch may be disclosed herein. In embodiments, each accelerator resource may be coupled with one node resource at a given time. In embodiments, an accelerator resource may be a Field Programmable Gate Array (FPGA), Graphical Processing Unit (GPU), an Application Specific Integrated Circuit (ASIC), Input/Output (I/O) accelerator, or other resource. In embodiments, an accelerator resource may implement a memory or other cache. In embodiments, a node resource may be a CPU.

Data center operations that include multiple data center racks may benefit from the flexibility to add, remove, or move connections of accelerator resources from one node resource to another node resource within a data center rack or a pod without physical intervention from an operator. In embodiments, accelerator resources, when connected with a node resource, may involve coherency and memory extensions. I/O accelerators may have load-store semantics.

Coherency extensions allow the accelerators to cache the system memory hosted by the node, enabling higher performance at a lower power. Memory extensions enable a node resource to access the memory hosted by the accelerator, in a way similar to system memory, thereby enabling better sharing between the node and the accelerator for better performance. Load-store semantics may allow a CPU or device to access memory-mapped resources directly as a load command (e.g., read) or as a store command (e.g., write).

In legacy implementations, it is challenging to share an accelerator resource among multiple node resources when the node resources may belong to different coherency domains. This may be due to tight coupling of resources in a coherency domain and fault isolation requirements across domains. Disadvantages of these legacy approaches may include limiting certain computing tasks to specific node resources that may have existing required functionality (i.e. existing coupled accelerator resources). Other disadvantages may include a data center that may be overprovisioned with resources to prepare for a worst-case computing scenario task or other operational requirement. This may result in an excess of deployed accelerator resources and resulting underutilization of the accelerator resources in a data center.

These and other challenges may be overcome by allowing accelerator resources and node resources to be connected using one or more interconnect switches to create a switchable path from a node resource to an accelerator resource. In embodiments, reconfiguring the switchable path may include hot-removing an accelerator resource from a connected node resource and then hot-adding the accelerator resource to the new node resource, using the interconnect switch and a resource manager. In embodiments, the connection between the node resources and accelerator resources may be changed via one or more software commands to the interconnect switch. In embodiments, no physical devices (e.g. accelerator resources) need to be physically moved.

In the following description, various aspects of the illustrative implementations are described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "including," "having," and the like, as used with respect to embodiments of the present disclosure, are synonymous.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

Various operations are described as multiple discrete operations in turn, in a manner that is most helpful in understanding the claimed subject matter. However, the order of description should not be construed as to imply that these operations are necessarily order dependent.

FIG. 1 is a diagram of an example implementation of a switch to connect node resources with accelerator resources, in accordance with various embodiments. Diagram 100 shows an interconnect switch 102 that may be managed by a resource manager 104. In embodiments, the resource manager 104 may be a part of the interconnect switch 102. In embodiments, the resource manager 104 may be external to but coupled with the interconnect switch 102. The interconnect switch 102 may use a FlexBus™ interconnect protocol or other protocol to support data on a Peripheral Component Interconnect Express (PCIe) bus or other bus.

One or more node resources 106a-106d may be coupled with the interconnect switch 102 or coupled with the resource manager 104. A node resource may be a CPU. A node resource may also be multiple CPUs connected using coherency links. In embodiments, one or more accelerator resources 108a-108d may be connected to the interconnect switch 102. In embodiments, accelerators may include FPGAs, GPUs, ASICs, I/O accelerators, or other resources. In embodiments, accelerator resources 108a-108d may be used as a cache for a node resource 106a-106d. Links 105a-105d may respectively connect node resources 106a-106d to the interconnect switch 102 and links 109a-109d may respectively connect accelerator resources 108a-108d to the interconnect switch 102.

In configurations, a node resource 106a-106d and accelerator resource 108a-108d may be connected to a plurality (not shown) of interconnect switches 102 that may be jointly managed by the resource manager 104. In embodiments, each of the plurality of interconnect switches 102 may be bit-sliced or hierarchical to allow for a higher radix switching across the higher number of nodes and accelerators.

A bit-sliced switch implementation may be realized by having multiple physical interconnect switches 102 each dealing with a different sub-set of lanes of the PCIe bus or other bus. For example, if each of the links 105a-105d, 109a-109d have 16 lanes, a switch with 8 links (radix=8), as shown in diagram 100 will need to be able to handle 128 lanes. If we need to extend that to 64 Links (radix=64) and a physical switch can only handle 128 Lanes, we can have 8 of these physical interconnect switches 102 forming one logical switch handling the connectivity across the 64 Links. For example, a first physical interconnect switch 102 may handle lanes 0 and 1 of each of the links 105a-105d, 109a-109d, the second physical interconnect switch (not shown) handles lanes 2 and 3 of each of the links 105a-105d, 109a-109d, and so on. This may build a higher radix switch (the one that handles 64 links rather than 8 links) while not extending the distance between the node and the accelerator.

Another approach for extending the switching radix is by using hierarchical switching (not shown) where different node resources 106a-106d may connect to different interconnect switches and the interconnect switches are connected through another layer of interconnect switches. In embodiments, a combination of bit-sliced and hierarchical switching may be used to extend the switching radix. These approaches may be used to provide connectivity between nodes and resources (such as accelerators) in a pod, which is a collection of racks. A rack is a physical enclosure where multiple nodes and accelerators may be hosted.

Turning back to diagram 100, resource manager 104 may determine that one of the node resources 106a-106d is to be connected with one of the accelerators resources 108a-108d. The resource manager 104 may receive requests from various nodes 106a-106d needing resources and may respond to the requests by allocating an accelerator resource from the resources 108a-108d to the requesting node. These requests and responses may be sent using standard manageability or networking resources (not shown) that support communication between a node resource 106a-106d and the resource manager 104.

For example, the resource manager 104 may receive a request to configure the interconnect switch 102 to directly connect a node resource 106a with an accelerator resource 108c. This configuration may be done entirely through software, for example by sending a command to one or more multiplexers such as multiplexers 207a1-207h1 of FIG. 2 (described below) within the interconnect switch 102.

Continuing the example, the resource manager 104 may determine that accelerator resource 108c may be already connected to another node resource 106d. The resource manager 104 may cause a disconnect, or a hot-remove, of the previously connected accelerator resource 108c from the node resource 106d. In embodiments, before the accelerator resource 108c may be hot-removed, system software that may be running in the node resource 106d and the accelerator resource 108c may quiesce data traffic between the accelerator resource 108c and the node resource 106d using mechanisms available within each of the resources. These mechanisms may include flushing caches of memory belonging to the other resource, ensuring all traffic between the accelerator resource 108c and node resource 106d is completed, and the like. Once the data traffic is quiesced, the system software may communicate with the resource manager 104 to initiate the hot-remove of accelerator resource 108c and from node 106d, which may involve disconnecting the connection between the corresponding link 109c and link 106d using the interconnect switch 102. Subsequently, the resource manager 104 may establish a connection between the links 105a, 109c between node resource 106a and accelerator resource 108c using the interconnect switch 102.

After the node resource 106a and the accelerator resource 108c are connected, configuration information may be exchanged between the node resource 106a and the accelerator resource 108c. The node resource 106a-106d may communicate with the interconnect switch 102 using a switch interface 106a1-106d1. In embodiments the node resource 106a-106d may communicate with the switch interface 106a1-106d1 using a PCIe port 106a2-106d2, an Intel Accelerator Link (IAL) port 106a3-106d3, or some other port (not shown).

Once the node resource 106a and accelerator resource 108c are connected, the switch interface 106a1 may perform link training with the accelerator resource 108c to coordinate and establish the connection to behave in a consistent manner. This link training may be accomplished using a Training Status State Machine (LTSSM).

After link training, a hot-add flow may begin in the node resource 106a with notification orchestrated by the resource manager 104. During the hot-add flow, the system software running in the host may discover the newly-added accelerator resource 108c and may perform initialization and/or mapping so that the node resource 106a can start using the accelerator resource 108c. Once the connection through the interconnect switch 102 is established, the increased latency in communication between the node resource 106a and accelerator resource 108c may be less than 10 nanoseconds (ns).

Figure 2:
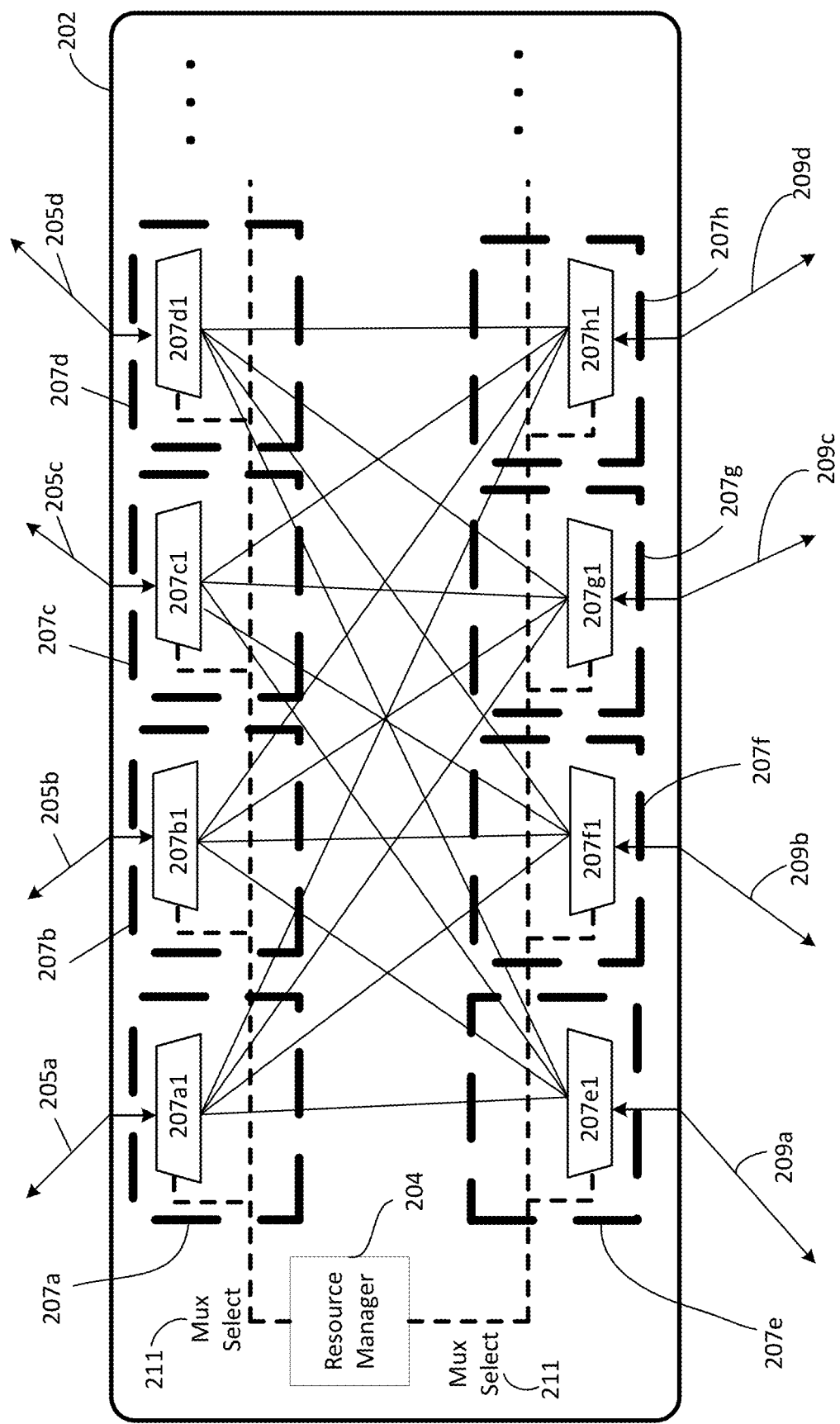
FIG. 2 is a diagram of an example interconnect switch including interconnect switch ports, in accordance with various embodiments.

FIG. 2 is a diagram of an example interconnect switch including interconnect switch ports, in accordance with various embodiments. Diagram 200 may show an interconnect switch 202, which may be similar to the interconnect switch 102 of FIG. 1. Links 205a-205d may be similar to links 105a-105d, and links 209a-209d may be similar to links 109a-109d. Links 205a-205d, 209a-209d may each connected, respectively, through connections between interconnect switch ports 207a-207h. The connections may be managed by resource manager 204, which may be similar to resource manager 104 of FIG. 1.

Figure 3:
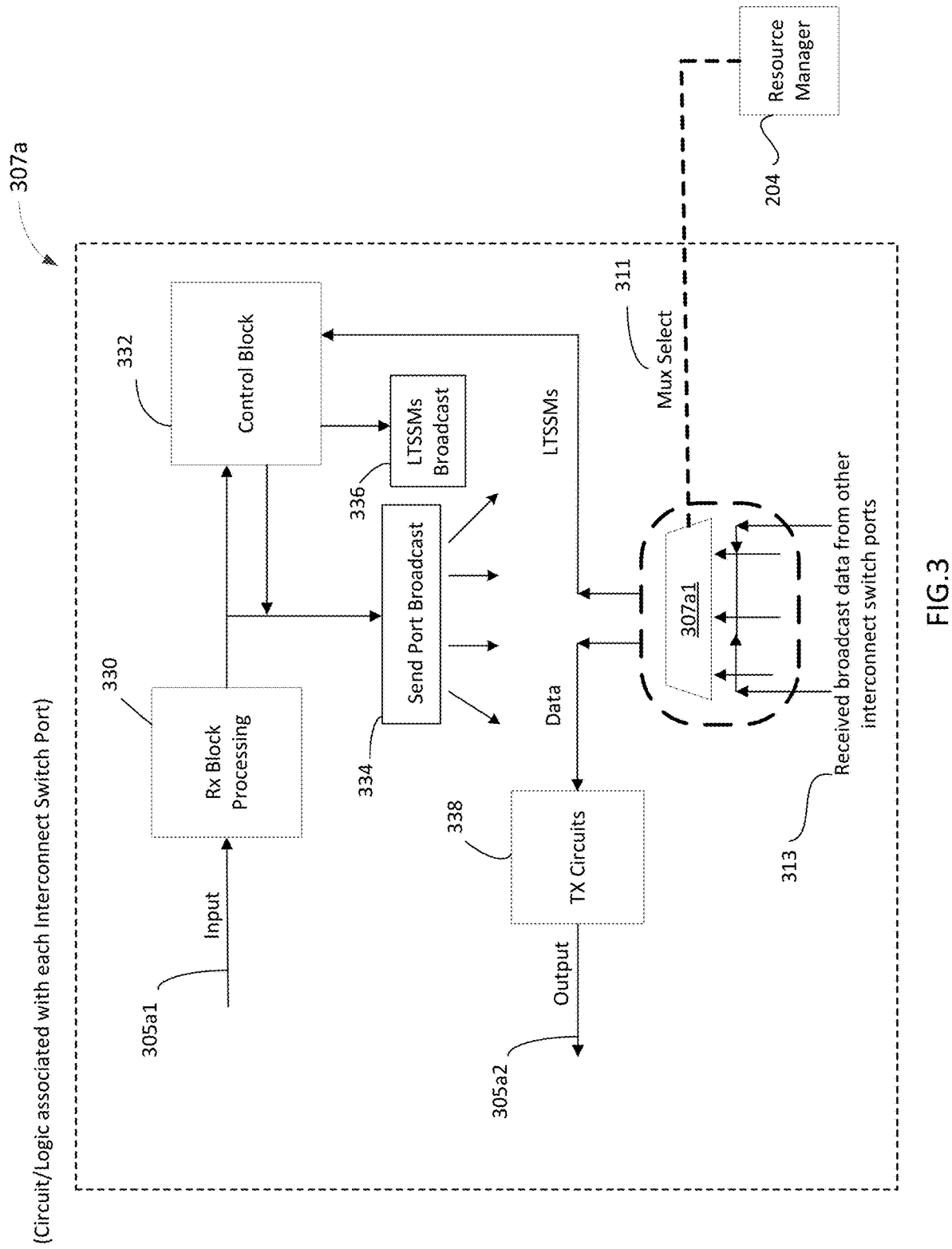
FIG. 3 is a diagram of an example implementation of an interconnect switch port, in accordance with various embodiments.

Each of the interconnect switch ports 207a-207h, which are described in further detail in FIG. 3, respectively include a mux 207a1-207h1. Each mux 207a1-207h1 may receive mux select information 211 from the resource manager 204 to indicate which one of a first set of muxes 207a1-207d1 is to be connected to a one of a second set of muxes 207e1-207h1 in order to establish a low-latency bypass path between one of links 205a-205d and one of links 209a-209d. In embodiments, muxes 207a1-207d1 in interconnect switch ports 207a1-207d1 associated with node resources 106a-106d may be connected with any other muxes 207e1-207h1 in interconnect switch ports 207e1-207h1 associated with accelerator resources 108a-108d, and vice-versa.

In embodiments, the interconnect switch 202 may be similar to a low latency retimer. The resulting low-latency bypass paths may provide a dramatic increase in speed between a connected node resource 106a-106d and a connected accelerator resource 108a-108d. Legacy implementations that connect a node resource and an accelerator resource using software paths or full hardware stacks to facilitate communication will encounter significant latency as the data packets traverse through the protocol stacks. Unlike legacy implementations, the interconnect switch 102 may have very low performance overhead by establishing a direct wired connection allowing for high communication speeds to support communication between a CPU and a I/O device, a cache, a GPU, or some other accelerator device.

FIG. 3 is a diagram of an example implementation of an interconnect switch port, in accordance with various embodiments. Diagram 307a shows details of an example interconnect switch port which may be similar to interconnect switch port 207a of FIG. 2. Diagram 307a may represent any interconnect switch port 207a-207h. Input may be received through link 305a1, and output may be sent through link 305a2. Links 305a1, 305a2 may be the same physical wire or bus, and may be similar to link 205a that may couple the interconnect switch port 307a with a switch interface 106a1 of a node resource 106a. Link 305a1 may include data received from a node resource over link 205a, and link 305a2 may include data to be sent to a node resource over link 205a. In other embodiments where the interconnect switch port is connected to an accelerator resource port such as resource port 209a, then link 305a1 may indicate data received from accelerator resource 108a over link 209a, and link 305a2 may indicate data to be sent to accelerator resource 108a over link 209a.

Receive (Rx) block processing 330 may receive data over link 305a and convert the data for use within the interconnect switch port 307a. For example, Rx block processing 330 may include converting the received data from a serial to a parallel format and performing data alignment, decoding, descrambling, and/or buffering. Additional functions may also be performed. Data from Rx Block Processing 330 may be used by the Control Block 332 to perform functions related to LTSSM link training as discussed above in addition to other functionality such as monitoring traffic and switching.

Data resulting from Rx Block Processing 330 as well as data resulting from the Control Block 332 may be combined. The Port Broadcast 334 function may take this combined data and broadcast it to all other interconnect switch ports 207a-207h. For example, if the interconnect switch port 307a is associated with a node resource 106a-106d, then Port Broadcast 334 may broadcast a copy of the data to the input of all muxes 207e1-207h1 associated respectively with interconnect switch ports 207e-207h of accelerator resources 108a-108d. If the interconnect switch port 307a is associated with an accelerator resource 108a-108d, then Port Broadcast 334 may broadcast a copy of the data to the input of all muxes 207a1-207d1 associated respectively with interconnect switch ports 207a-207d of node resources 106a-106d. Similarly, control block information from Control Block 332, which may include LTSSM information, may be broadcast to other LTSSMs using LTSSM Broadcast 336.

The mux 307a1, which may be similar to muxes 207a1-207h1 of FIG. 2, may receive data broadcast from all of or a plurality of other interconnect switch ports 207a-207h. For example, if the mux 307a1 is associated with a node resource 106a-106d, then the mux 307a1 may receive data from each of the interconnect switch ports 207e-207h associated respectively with accelerator resources 108a-108d. If the mux 207a1 is associated with an accelerator resource 108a-108d, then the mux 307a1 may receive data from each of the interconnect switch ports 207a-207d associated respectively with node resources 106a-106d.

Mux select information 311, which may be similar to mux select information 211 of FIG. 2, is provided by the resource manager 204, which may be outside of interconnect switch port 307a. Mux select information 311 may indicate to the mux 307a which of the Received broadcast data from other interconnect switch ports 313 from the other interconnect switch ports 207a-207d, or 207e-207h that the mux 307a should receive data from.

The received data may then be processed by Transmit (Tx) Circuits 338 and sent as output data 305a2 back to either the node resource 106a-106d or the accelerator resource 108a-108d to which the interconnect switch port 307a is associated. In addition, the received data that may be associated with LTSSM communications may be received by the Control Block 332. The Tx circuits 338 may perform the parallel to serial conversion of data along with applying the appropriate Tx Equalization values agreed to during initial link training.

Figure 4:
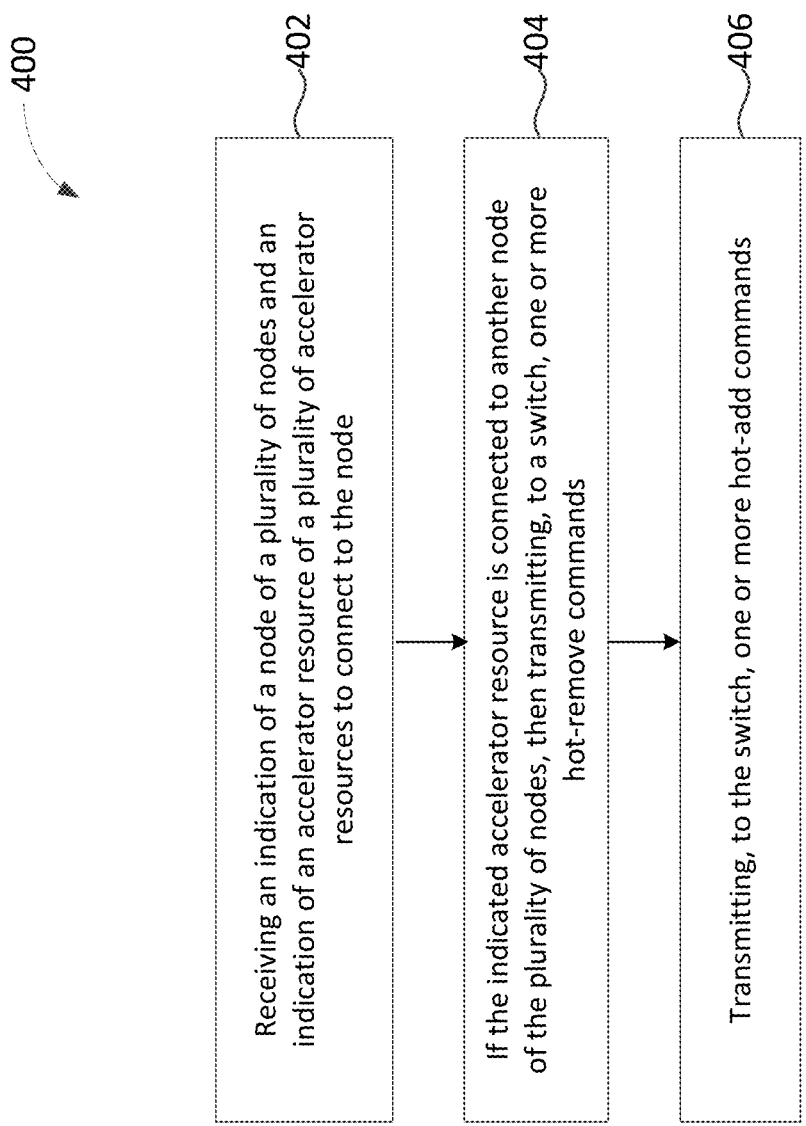
FIG. 4 is a block diagram that illustrates a process for implementing managing connections between node resources and accelerator resources using an interconnect switch, in accordance with various embodiments.

FIG. 4 is a block diagram that illustrates a process for implementing managing connections between node resources and accelerator resources using an interconnect switch, in accordance with various embodiments. In embodiments, the resource manager 104, the interconnect switch 102, node resources 106a-106d, switch interfaces 106a1-106d1, 108a1-108d1, and accelerator resources 108a-108d of FIG. 1 may perform a portion of, or may perform one or more processes such as the process 400.

At block 402, the process may include receiving an indication of a node resource of a plurality of node resources and an indication of an accelerator resource of a plurality of accelerator resources to connect to a node resource. The resource manager 104 may maintain a directory of node resources 106a-106d and accelerator resources 108a-108d and a list of which accelerator resources are currently connected to which node resources.

A node resource 106a-106d may send a request to the resource manager 104 to connect to an available accelerator resource or to a specific accelerator resource, depending on requirements of the node resource. A node resource 106a-106d may be a CPU or may be multiple CPUs connected using coherency links. In embodiments, node resources 106a-106d may belong in different coherency domains, and may be located in different racks or pods. In embodiments, the resource manager 104 may run on a single computer, or may be decentralized across multiple computers, depending on the configuration of the one or more interconnect switches 102.

At block 404, the process may include, if the indicated accelerator resource is connected to another node of the plurality of nodes, transmitting, to a circuit switch, one or more hot-remove commands. In embodiments, the resource manager 104 may check its directory to determine if the indicated accelerator resource is connected to another node. If the requested accelerator resource is already connected, then the resource manager 104 may transmit a hot-remove command to the interconnect switch 102. In embodiments, the hot-remove command may be a sequence of instructions to disconnect the connection between another node resource and the indicated accelerator resource. Prior to disconnecting the connection, the data traffic between the indicated accelerator resource and the other node resource may be quiesced as described above. In embodiments, the one or more commands may be to one or more interconnect switch ports 207a-207h and to respective muxes 207a1-207h1 to stop receiving broadcast data from other interconnect switch ports.

At block 406, the process may include transmitting to the switch one or more hot-add commands. In embodiments, the one or more hot-add commands may be to connect the indicated node with the indicated accelerator resource. This may include sending one or more commands to one or more interconnect switch ports 207a-207h, as described above, within the interconnect switch 102, to connect the indicated node resource and the indicated accelerator resource. This may include the resource manager 204 sending mux select 211 commands to individual muxes 207a1-207h1 to indicate to the individual muxes from which interconnect switch port 207a-207h the mux should start receiving data.

In embodiments, once the indicated node resource and the indicated accelerator resource are connected, the connection may be configured to enable data to be communicated over the connection. In embodiments, this may be referred to as link training and the subsequent hot-add flow. In embodiments, this may be done through LTSSM as described above so that bits can be physically exchanged between a node resource 106a-106d and the connected accelerator resource 108a-108d.

Figure 5:
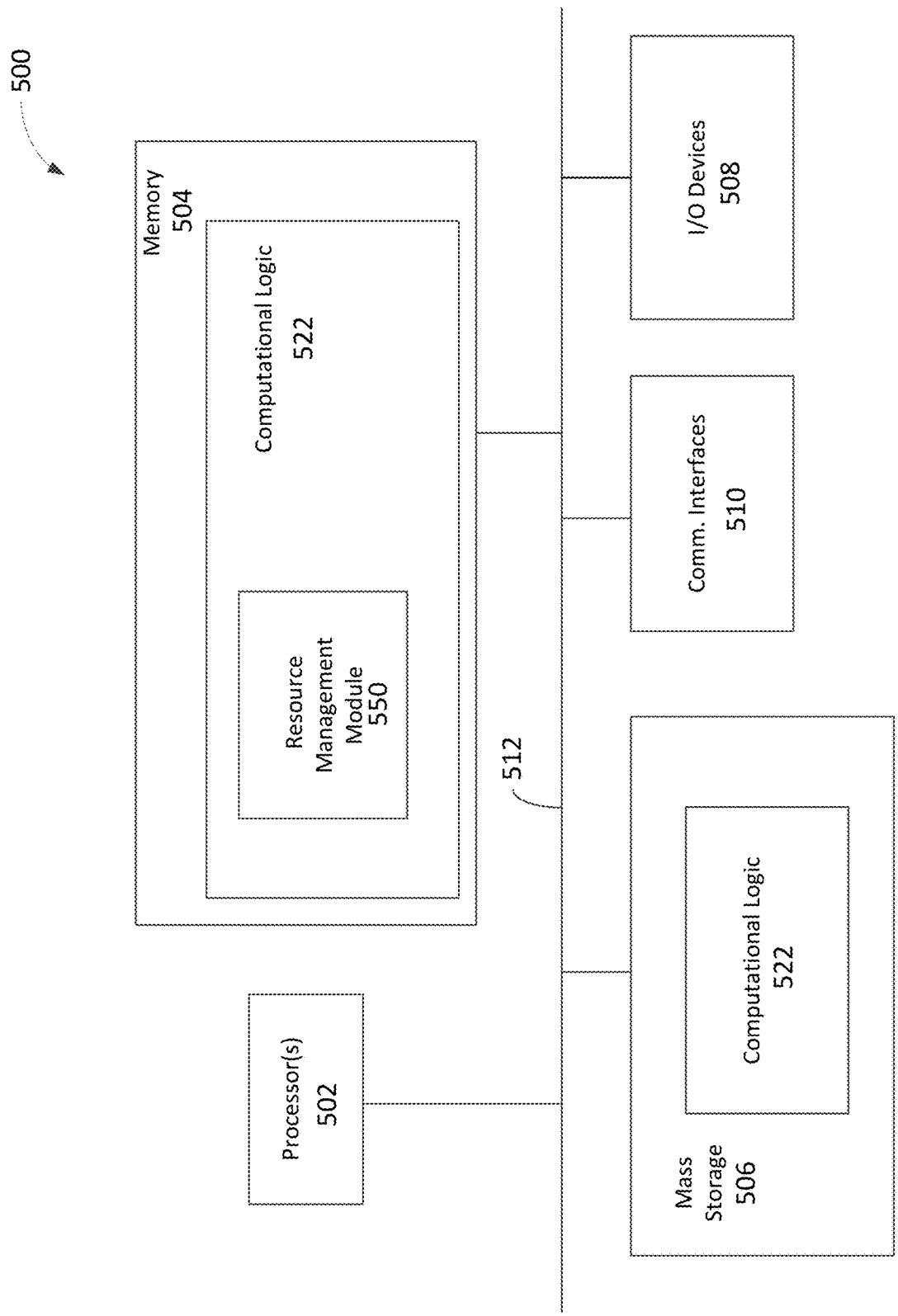
FIG. 5. illustrates an example computing device suitable for use to practice aspects of the present disclosure, in accordance with various embodiments.

FIG. 5 illustrates an example computing device suitable for use to practice aspects of the present disclosure, in accordance with various embodiments. The example computing device of diagram 500 may be suitable to practice the functions associated with diagrams 100, 200, 300, and 400. In embodiments, diagram 500 may be used to implement one or more resource managers 104.

As shown, computing device 500 may include one or more processors 502, each having one or more processor cores, and system memory 504. The processor 502 may include any type of unicore or multi-core processors. Each processor core may include a central processing unit (CPU), and one or more level of caches. The processor 502 may be implemented as an integrated circuit. The computing device 500 may include mass storage devices 506 (such as diskette, hard drive, volatile memory (e.g., dynamic random access memory (DRAM)), compact disc read only memory (CD-ROM), digital versatile disk (DVD) and so forth). In general, system memory 504 and/or mass storage devices 506 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

The computing device 500 may further include input/output (I/O) devices 508 such as a display, keyboard, cursor control, remote control, gaming controller, image capture device, and communication interfaces 510 (such as network interface cards, modems, infrared receivers, transceivers, radio receivers (e.g., Bluetooth), and so forth). I/O devices 508 may be suitable for communicative connections with an interconnect switch 102 of FIG. 1, a plurality of interconnect switches (not shown), or some other device necessary for implementing the functionalities coupling a node resource to an accelerator resource with reference to FIGS. 1-4.

In embodiments, communication interfaces 510 may include communication chips (not shown) that may be configured to operate the device 500 in accordance with wired or with wireless protocols.

The above-described computing device 500 elements may be coupled to each other via system bus 512, which may represent one or more buses. In the case of multiple buses, they may be bridged by one or more bus bridges (not shown). Each of these elements may perform its conventional functions known in the art. In particular, system memory 504 and mass storage devices 506 may be employed to store a working copy and a permanent copy of the programming instructions implementing the operations and functionalities associated with the resource manager 104, generally shown as computational logic 522. Computational logic 522 may be implemented by assembler instructions supported by processor(s) 502 or high-level languages that may be compiled into such instructions.

In embodiments, the Computational Logic 522 may contain a resource manager module 350, which may perform one or more of the functions associated with diagrams 100, 200, 300, and 400.

The permanent copy of the programming instructions may be placed into mass storage devices 506 in the factory, or in the field, though, for example, a distribution medium (not shown), such as a compact disc (CD), or through communication interfaces 310 (from a distribution server (not shown)).

FIG. 6 is a diagram illustrating computer readable media having instructions for practicing managing connections between node resources and accelerator resources using an interconnect switch, in accordance with various embodiments. Diagram 600 may illustrate computer readable media 602 having instructions for practicing the above-described techniques, or for programming/causing systems and devices to perform the above-described techniques, in accordance with various embodiments. In some embodiments, such computer readable media 602 may be included in a memory or storage device, which may be transitory or non-transitory, of the computing device 500 of FIG. 5. In embodiments, instructions 604 may include assembler instructions supported by a processing device, or may include instructions in a high-level language, such as C, that can be compiled into object code executable by the processing device. In some embodiments, a persistent copy of the computer readable instructions 604 may be placed into a persistent storage device in the factory or in the field (through, for example, a machine-accessible distribution medium (not shown)). In some embodiments, a persistent copy of the computer readable instructions 604 may be placed into a persistent storage device through a suitable communication pathway (e.g., from a distribution server).

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

EXAMPLES

Examples, according to various embodiments, may include the following.

Example 1 may be a resource manager, comprising: one or more processors; a resource manager module (RMM) communicatively coupled to the one or more processors, wherein the RMM is to: receive an indication of a node resource of a plurality of node resources and an indication of an accelerator resource of a plurality of accelerator resources to connect to the node resource; if the indicated accelerator resource is connected to another node resource of the plurality of node resources, then transmit, to an interconnect switch, one or more hot-remove commands; and transmit, to the interconnect switch, one or more hot-add commands.

Example 2 may include the resource manager of example 1, wherein the RMM is to track connections respectively of the plurality of accelerator resources to the plurality of node resources and to cause the interconnect switch to connect the indicated accelerator resource of the plurality of accelerator resources to the indicated node resource of the plurality of node resources.

Example 3 may include the resource manager of example 1, wherein the one or more hot-remove commands are to cause the interconnect switch to hot-remove the indicated accelerator resource from the another node resource.

Example 4 may include the resource manager of example 3, wherein to hot-remove the indicated accelerator resource from the another node resource further includes to cause data traffic on a connection between the indicated accelerator resource and the another node resource to become quiescent.

Example 5 may include the resource manager of example 3, wherein to hot-remove the indicated accelerator resource from the another node resource further includes to sever the connection between the indicated accelerator resource and the another node resource.

Example 6 may include the resource manager of example 1, wherein the one or more hot-add commands are to cause the interconnect switch to hot-add the indicated accelerator resource to the indicated node resource.

Example 7 may include the resource manager of any one of examples 1-6, wherein to hot-add the indicated accelerator resource to the indicated node resource further includes to: establish, via the interconnect switch, a connection between the indicated accelerator resource and the indicated node resource; configure, via the interconnect switch, the indicated accelerator resource to communicate with the indicated node resource over the established connection; and configure, via the interconnect switch, the indicated node resource to communicate with the indicated accelerator resource over the established connection.

Example 8 may include the resource manager of example 7, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

Example 9 may include the resource manager of example 8, wherein an active established connection between the indicated accelerator resource and the indicated node resource includes data flow between the indicated accelerator resource and the indicated node resource.

Example 10 may include the resource manager of any one of examples 1-6, wherein the interconnect switch is a low-latency bypass path that includes a first and a second plurality of ports, each of the first set of ports includes a multiplexer with a direct connection to each of the second plurality of ports, and wherein the interconnect switch receives commands from the RMM to hot-add or hot-remove connections between one of the first set of plurality of ports and one of the second set of the plurality of ports.

Example 11 may include the resource manager of example 10, wherein one or more of the first set of ports are connected respectively to one or more of the plurality of accelerator resources and one or more of the second set of ports are connected respectively to one or more of the plurality of node resources.

Example 12 may include the resource manager of any one of examples 1-6, wherein the plurality of accelerator resources includes a Field Programmable Gate Array (FPGA), a Graphical Processor Unit (GPU), or an Application Specific Integrated Circuit (ASIC).

Example 13 may include the resource manager of any one of examples 1-6, wherein the plurality of node resources includes a Central Processing Unit (CPU) or a System on a Chip (SOC).

Example 14 may include the resource manager of any one of examples 1-6, wherein the indicated node resource is a plurality of CPUs coupled using coherency links.

Example 15 may include the resource manager of any one of examples 1-6, wherein the indicated accelerator resource is a cache for the indicated node resource.

Example 16 may include the resource manager of example 1, wherein some of the plurality of node resources are in different coherency domains.

Example 17 may include the resource manager of any one of examples 1-6, wherein some of the plurality of accelerator resources are associated with different coherency domains.

Example 18 may include the resource manager of example 1, wherein the indicated node resource includes a Peripheral Component Interconnect Express (PCIe) port or an Intel Accelerator Link (IAL) port.

Example 19 may include the resource manager of example 1, wherein the resource manager is located within the interconnect switch.

Example 20 may include the resource manager of example 1, wherein the interconnect switch is a plurality of interconnect switches.

Example 21 may include the resource manager of any one of examples 1-20, wherein the indicated node resource and the indicated accelerator resource are in different racks.

Example 22 may include the resource manager of any one of examples 1-20, wherein the indicated node resource and the indicated accelerator resource are in different pods.

Example 23 may be a method to manage resources, comprising: receiving an indication of a node resource of a plurality of node resources and an indication of an accelerator resource of a plurality of accelerator resources to connect to the node resource; if the indicated accelerator resource is connected to another node resource of the plurality of node resources, then transmitting, to an interconnect switch, one or more hot-remove commands; and transmitting, to the interconnect switch, one or more hot-add commands.

Example 24 may include the method of example 23, further comprising tracking connections respectively of the plurality of accelerator resources to the plurality of node resources.

Example 25 may include the method of example 23, further comprising causing the interconnect switch to connect the indicated accelerator resource of the plurality of accelerator resources to the indicated node resource of the plurality of node resources.

Example 26 may include the method of example 23, wherein the one or more hot-remove commands are to cause the interconnect switch to hot-remove the indicated accelerator resource from the another node resource.

Example 27 may include the method of example 26, wherein to hot-remove the indicated accelerator resource from the another node resource further includes to cause data traffic on a connection between the indicated accelerator resource and the another node resource to become quiescent.

Example 28 may include the method of example 26, wherein to hot-remove the indicated accelerator resource from the another node resource further includes to sever the connection between the indicated accelerator resource and the another node resource.

Example 29 may include the method of example 23, wherein the one or more hot-add commands are to cause the interconnect switch to hot-add the indicated accelerator resource to the indicated node resource.

Example 30 may include the method of example 29, wherein to hot-add the indicated accelerator resource to the indicated node resource further includes: establishing, by the interconnect switch, a connection between the indicated accelerator resource and the indicated node resource; configuring, by the interconnect switch, the indicated accelerator resource to communicate with the indicated node resource over the established connection; and configuring, by the interconnect switch, the indicated node resource to communicate with the indicated accelerator resource over the established connection.

Example 31 may include the method of example 30, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

Example 32 may include the method of example 31, wherein an active established connection between the indicated accelerator resource and the indicated node resource includes data flow between the indicated accelerator resource and the indicated node resource.

Example 33 may include the method of example 23, wherein the interconnect switch is a low-latency bypass path that includes a first and a second plurality of ports, each of the first set of ports includes a multiplexer with a direct connection to each of the second plurality of ports; and further comprising receiving, by the interconnect switch, commands to hot-add or hot-remove connections between one of the first set of plurality of ports and one of the second set of the plurality of ports.

Example 34 may include the method of example 33, wherein one or more of the first set of ports are connected respectively to one or more of the plurality of accelerator resources and one or more of the second set of ports are connected respectively to one or more of the plurality of node resources.

Example 35 may include the method of example 23, wherein the plurality of accelerator resources includes a Field Programmable Gate Array (FPGA), a Graphical Processor Unit (GPU), or an Application Specific Integrated Circuit (ASIC).

Example 36 may include the method of example 23, wherein the plurality of node resources includes a Central Processing Unit (CPU) or a System on a Chip (SOC).

Example 37 may include the method of example 23, wherein the indicated node resource is a plurality of CPUs coupled using coherency links.

Example 38 may include the method of example 23, wherein the indicated accelerator resource is a cache for the indicated node resource.

Example 39 may include the method of example 23, wherein some of the plurality of node resources are in different coherency domains.

Example 40 may include the method of example 23, wherein some of the plurality of accelerator resources are associated with different coherency domains.

Example 41 may include the method of example 23, wherein the indicated node resource includes a Peripheral Component Interconnect Express (PCIe) port or an Intel Accelerator Link (IAL) port.

Example 42 may include the method of example 23, wherein the method is performed within the interconnect switch.

Example 43 may include the method of example 23, wherein the interconnect switch is a plurality of interconnect switches.

Example 44 may include the method of any one of examples 23-43, wherein the indicated node resource and the indicated accelerator resource are in different racks.

Example 45 may include the method of any one of examples 23-43, wherein the indicated node resource and the indicated accelerator resource are in different pods.

Example 46 may be a resource manager apparatus, comprising: means for receiving an indication of a node resource of a plurality of node resources and an indication of an accelerator resource of a plurality of accelerator resources to connect to the node resource; if the indicated accelerator resource is connected to another node resource of the plurality of node resources, then means for transmitting, to an interconnect switch, one or more hot-remove commands; and means for transmitting, to the interconnect switch, one or more hot-add commands.

Example 47 may include the apparatus of example 46, further comprising means for tracking connections respectively of the plurality of accelerator resources to the plurality of node resources.

Example 48 may include the apparatus of example 46, further comprising means for causing the interconnect switch to connect the indicated accelerator resource of the plurality of accelerator resources to the indicated node resource of the plurality of node resources.

Example 49 may include the apparatus of example 46, wherein the one or more hot-remove commands are to cause the interconnect switch to hot-remove the indicated accelerator resource from the another node resource.

Example 50 may include the apparatus of example 49, wherein to hot-remove the indicated accelerator resource from the another node resource further includes to cause data traffic on a connection between the indicated accelerator resource and the another node resource to become quiescent.

Example 51 may include the apparatus of example 49, wherein to hot-remove the indicated accelerator resource from the another node resource further includes to sever the connection between the indicated accelerator resource and the another node resource.

Example 52 may include the apparatus of example 46, wherein the one or more hot-add commands are to cause the interconnect switch to hot-add the indicated accelerator resource to the indicated node resource.

Example 53 may include the apparatus of example 52, wherein to hot-add the indicated accelerator resource to the indicated node resource further includes: establishing, by the interconnect switch, a connection between the indicated accelerator resource and the indicated node resource; configuring, by the interconnect switch, the indicated accelerator resource to communicate with the indicated node resource over the established connection; and configuring, by the interconnect switch, the indicated node resource to communicate with the indicated accelerator resource over the established connection.

Example 54 may include the apparatus of example 53, wherein a time duration between receipt by the interconnect switch of the one or more commands to hot-add the indicated accelerator resource to the indicated node resource and an active established connection between the indicated accelerator resource and the indicated node resource is less than 10 nanoseconds (ns).

Example 55 may include the apparatus of example 54, wherein an active established connection between the indicated accelerator resource and the indicated node resource includes data flow between the indicated accelerator resource and the indicated node resource.

Example 56 may include the apparatus of example 46, wherein the interconnect switch is a low-latency bypass path that includes a first and a second plurality of ports, each of the first set of ports includes a multiplexer with a direct connection to each of the second plurality of ports; and further comprising means for receiving, by the interconnect switch, commands to hot-add or hot-remove connections between one of the first set of plurality of ports and one of the second set of the plurality of ports.

Example 57 may include the apparatus of example 56, wherein one or more of the first set of ports are connected respectively to one or more of the plurality of accelerator resources and one or more of the second set of ports are connected respectively to one or more of the plurality of node resources.

Example 58 may include the apparatus of example 46, wherein the plurality of accelerator resources includes a Field Programmable Gate Array (FPGA), a Graphical Processor Unit (GPU), or an Application Specific Integrated Circuit (ASIC).

Example 59 may include the apparatus of example 46, wherein the plurality of node resources includes a Central Processing Unit (CPU) or a System on a Chip (SOC).

Example 60 may include the apparatus of example 46, wherein the indicated node resource is a plurality of CPUs coupled using coherency links.

Example 61 may include the apparatus of example 46, wherein the indicated accelerator resource is a cache for the indicated node resource.

Example 62 may include the apparatus of example 46, wherein some of the plurality of node resources are in different coherency domains.

Example 63 may include the apparatus of example 46, wherein some of the plurality of accelerator resources are associated with different coherency domains.

Example 64 may include the apparatus of example 46, wherein the indicated node resource includes a Peripheral Component Interconnect Express (PCIe) port or an Intel Accelerator Link (IAL) port.

Example 65 may include the apparatus of example 46, wherein the method is performed within the interconnect switch.

Example 66 may include the apparatus of example 46, wherein the interconnect switch is a plurality of interconnect switches.

Example 67 may include the apparatus of any one of examples 46-66, wherein the indicated node resource and the indicated accelerator resource are in different racks.

Example 68 may include the apparatus of any one of examples 46-66, wherein the indicated node resource and the indicated accelerator resource are in different pods.

Example 69 may be a system comprising: one or more processors; a resource manager module (RMM) communicatively coupled to the one or more processors, wherein the RMM is to: receive an indication of a node resource of a plurality of node resources and an indication of an accelerator resource of a plurality of accelerator resources to connect to the node resource; if the indicated accelerator resource is connected to another node resource of the plurality of node resources, then transmit, to an interconnect switch, one or more hot-remove commands; and transmit, to the interconnect switch, one or more hot-add commands; and the interconnect switch communicatively coupled to the RMM to provide a low-latency bypass path between the plurality of node resources and the plurality of accelerator resources comprising a first and a second plurality of ports, each of the first set of ports includes a multiplexer with a direct connection to each of the second plurality of ports; and wherein the interconnect switch is to receive one or more hot-remove commands to disconnect another node resource from the indicated accelerator resource or hot-add commands to connect the indicated node resource to the indicated accelerator resource.

Example 70 may include the system of example 69, wherein the RMM is to communicate directly with the plurality of multiplexers.

Example 71 may include the system of any one of examples 69-70, wherein one or more of the first set of ports are connected respectively to one or more of the plurality of accelerator resources and one or more of the second set of ports are connected respectively to one or more of the plurality of node resources.

Example 72 may include the system of example 69, wherein the plurality of accelerator resources includes a Field Programmable Gate Array (FPGA), a Graphical Processor Unit (GPU), or an Application Specific Integrated Circuit (ASIC).

Example 73 may include the system of example 69, wherein the plurality of node resources includes a Central Processing Unit (CPU) or a System on a Chip (SOC).

Example 74 may include the system of example 69, wherein the indicated node resource is a plurality of CPUs coupled using coherency links.

Example 75 may include the system of example 69, wherein the indicated accelerator resource is a cache for the indicated node resource.

Example 76 may include the system of example 69, wherein some of the plurality of node resources are in different coherency domains.

Example 77 may include the system of example 69, wherein some of the plurality of accelerator resources are associated with different coherency domains.

Example 78 may include the system of example 69, wherein the indicated node resource includes a Peripheral Component Interconnect Express (PCIe) port or an Intel Accelerator Link (IAL) port.

Example 79 may include the system of example 69, wherein the RMM module is located within the interconnect switch.

Example 80 may include the system of example 69, wherein the interconnect switch is a plurality of interconnect switches.

Example 81 may include the system of any one of examples 69-80, wherein the indicated node resource and the indicated accelerator resource are in different racks.

Example 82 may include the system of any one of examples 69-80, wherein the indicated node resource and the indicated accelerator resource are in different pods.

What is claimed is:

1. An interconnect retimer switch for use in communicatively coupling central processing unit (CPU) nodes and resource nodes, the CPU nodes to be coupled to the interconnect retimer switch via switch interfaces, the interconnect retimer switch comprising:
    ports to be communicatively coupled to the CPU nodes and the resource nodes;
    multiplexers associated with the ports, the multiplexers being configurable to provide selectable communication paths between respective ones of the ports so as to selectively communicatively couple respective of the CPU nodes with respective of the resource nodes; and
    in association with connection establishment between at least one of the CPU nodes and at least one of the resource nodes;
    wherein:
       the switch interfaces permit communication with the CPU nodes via multiple interconnect protocols;
       the multiple interconnect protocols include Peripheral Component Interconnect Express (PCIe) protocol;
       the interconnect retimer switch is configured for use with the multiple interconnect protocols; and
       the multiplexers are configurable based upon configuration data to be provided from management software to the interconnect retimer switch;
    wherein:
       the interconnect retimer switch is configured to use Flexbus interconnect protocol;
       the multiple interconnect protocols also comprise Intel Accelerator Link protocol; and
       the interconnect retimer switch is configured to perform data processing operations related to serial to parallel format conversion, data alignment, decoding, descrambling, and buffering.

2. The interconnect retimer switch of claim 1, wherein:
    the interconnect retimer switch is configurable to be used in association with bit-sliced and/or hierarchical configuration with at least one other interconnect retimer switch.

3. The interconnect retimer switch of claim 2, wherein:
    the multiplexers are configurable to:
       disconnect an established connection via the interconnect retimer switch between one of the CPU nodes and one of the resource nodes; and
       establish another connection via the interconnect retimer switch between another of the CPU nodes and the one of the resource nodes.

4. The interconnect retimer switch of claim 3, wherein:
    the multiplexers are configurable based upon the configuration data to establish at least one communication path between the at least one of the CPU nodes and the at least one of the resource nodes that bypasses the at least one LTSSM-related circuit.

5. The interconnect retimer switch of claim 4, wherein:
the interconnect retimer switch is to be used in association with a rack and/or pod in a data center; and
the at least one of the resource nodes comprises a field programmable gate array (FPGA), graphical processing unit (GPU), input/output (I/O) accelerator, and/or cache.

6. At least one non-transitory computer-readable medium storing instructions for being executed by at least one machine, the at least one machine being associated with an interconnect retimer switch, the interconnect retimer switch being for use incommunicatively coupling central processing unit (CPU) nodes and resource nodes, the CPU nodes to be coupled to the interconnect retimer switch via switch interfaces, the interconnect retimer switch comprising (1) ports to be communicatively coupled to the CPU nodes and the resource nodes, (2) multiplexers associated with the ports, and (3) at least one Link Training Status State Machine (LTSSM)-related circuit, the instructions, when executed, resulting in performance of operations comprising:
configuring the multiplexers to provide selectable communication paths between respective ones of the ports so as to selectively communicatively couple respective of the CPU nodes with respective of the resource nodes; and
using the at least one LTSSM-related circuit in association with connection establishment between at least one of the CPU nodes and at least one of the resource nodes;
wherein:
the switch interfaces permit communication with the CPU nodes via multiple interconnect protocols;
the multiple interconnect protocols include Peripheral Component Interconnect Express (PCIe) protocol;
the interconnect retimer switch is configured for use with the multiple interconnect protocols; and
the multiplexers are configurable based upon configuration data to be provided from management software to the interconnect retimer switch,
wherein:
the interconnect retimer switch is configured to use Flexbus interconnect protocol;
the multiple interconnect protocols also comprise Intel Accelerator Link protocol, and
the interconnect retimer switch is configured to perform data processing operations related to serial to parallel format conversion, data alignment, decoding, descrambling, and buffering.

7. The at least one non-transitory computer-readable medium of claim 6, wherein:
the interconnect retimer switch is configurable to be used in association with bit-sliced and/or hierarchical configuration with at least one other interconnect retimer switch.

8. The at least one non-transitory computer-readable medium of claim 7, wherein:
the multiplexers are configurable to:
disconnect an established connection via the interconnect retimer switch between one of the CPU nodes and one of the resource nodes; and
establish another connection via the interconnect retimer switch between another of the CPU nodes and the one of the resource nodes.

9. The at least one non-transitory computer-readable medium of claim 8, wherein:
the multiplexers are configurable based upon the configuration data to establish at least one communication path between the at least one of the CPU nodes and the at least one of the resource nodes that bypasses the at least one LTSSM-related circuit.

10. The at least one non-transitory computer-readable medium of claim 9, wherein:
the interconnect retimer switch is to be used in association with a rack and/or pod in a data center; and
the at least one of the resource nodes comprises a field programmable gate array (FPGA), graphical processing unit (GPU), input/output (I/O) accelerator, and/or cache.

11. A method implemented, at least in part, using an interconnect retimer switch, the interconnect retimer switch being for use in communicatively coupling central processing unit (CPU) nodes and resource nodes, the CPU nodes to be coupled to the interconnect retimer switch via switch interfaces, the interconnect retimer switch comprising (1) ports to be communicatively coupled to the CPU nodes and the resource nodes, (2) multiplexers associated with the ports, and (3) at least one Link Training Status State Machine (LTSSM)-related circuit, the method comprising:
configuring the multiplexers to provide selectable communication paths between respective ones of the ports so as to selectively communicatively couple respective of the CPU nodes with respective of the resource nodes; and
using the at least one LTSSM-related circuit in association with connection establishment between at least one of the CPU nodes and at least one of the resource nodes;
wherein:
the switch interfaces permit communication with the CPU nodes via multiple interconnect protocols;
the multiple interconnect protocols include Peripheral Component Interconnect Express (PCIe) protocol;
the interconnect retimer switch is configured for use with the multiple interconnect protocols; and
the multiplexers are configurable based upon configuration data to be provided from management software to the interconnect retimer switch;
wherein:
the interconnect retimer switch is configured to use Flexbus interconnect protocol;
the multiple interconnect protocols also comprise Intel Accelerator Link protocol; and
the interconnect retimer switch is configured to perform data processing operations related to serial to parallel format conversion, data alignment, decoding, descrambling, and buffering.

12. The method of claim 11, wherein:
the interconnect retimer switch is configurable to be used in association with bit-sliced and/or hierarchical configuration with at least one other interconnect retimer switch.

13. The method of claim 12, wherein:
the multiplexers are configurable to:
disconnect an established connection via the interconnect retimer switch between one of the CPU nodes and one of the resource nodes; and
establish another connection via the interconnect retimer switch between another of the CPU nodes and the one of the resource nodes.

14. The method of claim 13, wherein:
the multiplexers are configurable based upon the configuration data to establish at least one communication path between the at least one of the CPU nodes and the at least one of the resource nodes that bypasses the at least one LTSSM-related circuit.

15. The method of claim 14, wherein:
the interconnect retimer switch is to be used in association with a rack and/or pod in a data center; and
the at least one of the resource nodes comprises a field programmable gate array (FPGA), graphical processing unit (GPU), input/output (I/O) accelerator, and/or cache.

16. A rack system usable in association with a data center, the rack system comprising:
central processing unit (CPU) nodes;
resource nodes;
switch interfaces; and
an interconnect retimer switch for use in communicatively coupling the CPU nodes and the resource nodes, the CPU nodes to be coupled to the interconnect retimer switch via the switch interfaces, the interconnect retimer switch comprising:
   ports to be communicatively coupled to the CPU nodes and the resource nodes;
   multiplexers associated with the ports, the multiplexers being configurable to provide selectable communication paths between respective ones of the ports so as to selectively communicatively couple respective of the CPU nodes with respective of the resource nodes; and
   at least one Link Training Status State Machine (LTSSM)-related circuit for use in association with connection establishment between at least one of the CPU nodes and at least one of the resource nodes;
wherein:
   the switch interfaces permit communication with the CPU nodes via multiple interconnect protocols;
   the multiple interconnect protocols include Peripheral Component Interconnect Express (PCIe) protocol;
   the interconnect retimer switch is configured for use with the multiple interconnect protocols, and
   the multiplexers are configurable based upon configuration data to be provided from management software to the interconnect retimer switch;
wherein:
   the interconnect retimer switch is configured to use Flexbus interconnect protocol;
   the multiple interconnect protocols also comprise Intel Accelerator Link protocol; and
      the interconnect retimer switch is configured to perform data processing operations related to serial to parallel format conversion, data alignment, decoding, descrambling, and buffering.

17. The rack system of claim 16, wherein:
the interconnect retimer switch is configurable to be used in association with bit-sliced and/or hierarchical configuration with at least one other interconnect retimer switch; and
the multiplexers are configurable to:
   disconnect an established connection via the interconnect retimer switch between one of the CPU nodes and one of the resource nodes; and
   establish another connection via the interconnect retimer switch between another of the CPU nodes and the one of the resource nodes.

18. The rack system of claim 17, wherein:
the multiplexers are configurable based upon the configuration data to establish at least one communication path between the at least one of the CPU nodes and the at least one of the resource nodes that bypasses the at least one LTSSM-related circuit; and
the at least one of the resource nodes comprises a field programmable gate array (FPGA), graphical processing unit (GPU), input/output (I/O) accelerator, and/or cache.

* * * * *